United States Patent
Klinglesmith et al.

(10) Patent No.: US 9,990,327 B2
(45) Date of Patent: *Jun. 5, 2018

(54) PROVIDING MULTIPLE ROOTS IN A SEMICONDUCTOR DEVICE

(71) Applicant: Intel Corporation, Santa Clara, CA (US)

(72) Inventors: Michael T. Klinglesmith, Portland, OR (US); Chang Yong Kang, Chandler, AZ (US); Robert DeGruijl, San Francisco, CA (US); Ioannis T. Schoinas, Portland, OR (US); Darren Abramson, Folsom, CA (US); Khee Wooi Lee, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 14/880,443

(22) Filed: Oct. 12, 2015

(65) Prior Publication Data

US 2016/0357700 A1 Dec. 8, 2016

Related U.S. Application Data

(60) Provisional application No. 62/170,905, filed on Jun. 4, 2015.

(51) Int. Cl.
*G06F 13/14* (2006.01)
*G06F 13/42* (2006.01)
(Continued)

(52) U.S. Cl.
CPC ........ *G06F 13/4282* (2013.01); *G06F 3/0604* (2013.01); *G06F 3/068* (2013.01);
(Continued)

(58) Field of Classification Search
None
See application file for complete search history.

(56) References Cited

U.S. PATENT DOCUMENTS 6,009,488 A 12/1999 Kavipurapu
6,694,380 B1 2/2004 Wolrich et al.
(Continued)

FOREIGN PATENT DOCUMENTS

EP 1195689 4/2002
EP 2345969 7/2011

OTHER PUBLICATIONS

Intel Corporation, "An Introduction to the Intel QuickPath Interconnect," Jan. 2009, pp. 1-22.
(Continued)

*Primary Examiner* — Cheng-Yuan Tseng
(74) *Attorney, Agent, or Firm* — Trop, Pruner & Hu, P.C.

(57) ABSTRACT

In one embodiment, a system includes: a first root space associated with a first root space identifier and including at least one first host processor and a first agent, the at least one first host processor and the first agent associated with the first root space identifier; a second root space associated with a second root space identifier and including at least one second host processor and a second agent, the at least one second host processor and the second agent associated with the second root space identifier; and a shared fabric to couple the first root space and the second root space, the shared fabric to route a transaction to the first root space or the second root space based at least in part on a root space field of the transaction. Other embodiments are described and claimed.

17 Claims, 13 Drawing Sheets

(51) Int. Cl.
*G06F 3/06* (2006.01)
*G06F 12/0817* (2016.01)
*G06F 13/16* (2006.01)

(52) U.S. Cl.
CPC ........ *G06F 3/0644* (2013.01); *G06F 12/0828* (2013.01); *G06F 13/1663* (2013.01); *G06F 2212/621* (2013.01)

(56) References Cited

U.S. PATENT DOCUMENTS

| | | | |
|---|---|---|---|
| 6,810,460 | B1 | 10/2004 | Kirkwood |
| 6,816,938 | B2 | 11/2004 | Edara et al. |
| 7,334,071 | B2 | 2/2008 | Onfryk |
| 7,457,905 | B2 | 11/2008 | Gehman |
| 7,506,089 | B2 | 3/2009 | Cho et al. |
| 7,723,902 | B2 | 5/2010 | Mandhani et al. |
| 7,783,819 | B2 | 8/2010 | Mandhani |
| 7,873,068 | B2 | 1/2011 | Klinglesmith et al. |
| 7,979,592 | B1 | 7/2011 | Pettey |
| 8,010,731 | B2 | 8/2011 | Mandhani |
| 8,346,997 | B2 * | 1/2013 | Freimuth ............ G06F 13/4022 370/216 |
| 8,711,875 | B2 | 4/2014 | Lakshmanamurthy |
| 8,713,234 | B2 | 4/2014 | Lakshmanamurthy |
| 8,713,240 | B2 | 4/2014 | Lakshmanamurthy |
| 8,775,700 | B2 | 7/2014 | Lakshmanamurthy |
| 8,805,926 | B2 | 8/2014 | Lakshmanamurthy |
| 8,874,976 | B2 | 10/2014 | Lakshmanamurthy |
| 8,929,373 | B2 | 1/2015 | Lakshmanamurthy |
| 8,930,602 | B2 | 1/2015 | Lakshmanamurthy |
| 9,021,156 | B2 | 4/2015 | Lakshmanamurthy |
| 9,053,251 | B2 | 6/2015 | Lakshmanamurthy |
| 2004/0098475 | A1 | 5/2004 | Zeitler et al. |
| 2005/0177664 | A1 | 5/2005 | Cho et al. |
| 2005/0289369 | A1 | 12/2005 | Chung et al. |
| 2005/0289374 | A1 | 12/2005 | Kim et al. |
| 2007/0067549 | A1 | 3/2007 | Gehman |
| 2008/0082840 | A1 | 4/2008 | Kendall et al. |
| 2008/0147858 | A1 | 6/2008 | Prakash et al. |
| 2008/0235415 | A1 | 9/2008 | Clark et al. |
| 2009/0235099 | A1 | 9/2009 | Branover et al. |
| 2009/0249098 | A1 | 10/2009 | Han et al. |
| 2009/0276773 | A1 | 11/2009 | Brown et al. |
| 2010/0165874 | A1 | 7/2010 | Brown et al. |
| 2011/0219164 | A1 | 9/2011 | Suzuki |
| 2012/0166690 | A1 | 6/2012 | Regula |
| 2012/0192178 | A1 | 7/2012 | Brownlow et al. |
| 2012/0221764 | A1 | 8/2012 | Glass et al. |
| 2012/0278814 | A1 | 11/2012 | Shivalingappa et al. |
| 2013/0086296 | A1 | 4/2013 | Lakshmanamurthy et al. |
| 2013/0343228 | A1 | 12/2013 | Cohen |
| 2014/0237154 | A1 | 8/2014 | Mandhani et al. |
| 2014/0258620 | A1 * | 9/2014 | Nagarajan ............ G06F 12/0815 711/120 |
| 2015/0019788 | A1 | 1/2015 | Adler et al. |
| 2015/0046661 | A1 | 2/2015 | Gathala et al. |
| 2015/0149661 | A1 | 5/2015 | Kanigicherla |
| 2015/0370661 | A1 | 12/2015 | Swanson et al. |
| 2016/0180001 | A1 | 6/2016 | Adler |
| 2016/0210259 | A1 | 7/2016 | Tsirkin |
| 2016/0328344 | A1 | 11/2016 | Jose et al. |

OTHER PUBLICATIONS

Sousek, et al., "PCI Express Core Integration with the OCP Bus," CAST, Inc. 2006, 15 pages.
Mentor Graphics, "PCI Express to AMBA 3 AXI Bridge IP," Mentor Graphics, Jun. 2007, 2 pages.
Everton Carara, et al., "Communication Models in Networks-on-Chip," 18th IEEE/IFIP International Workshop on Rapid System Prototyping (RSP '07), 2007, pp. 57-60.
U.S. Appl. No. 14/865,005, filed Sep. 25, 2015, entitled, "Handling a Partition Reset in a Multi-Root System," by Michael T. Klinglesmith, et al.
International Searching Authority, "Notification of Transmittal of the International Search Report and the Written Opinion of the International Searching Authority," dated Aug. 18, 2016 in International application No. PCT/US2016/030951.
United States Patent and Trademark Office, Final Office dated Aug. 3, 2017, and Reply filed Sep. 28, 2017, in U.S. Appl. No. 14/865,005.
United States Patent and Trademark Office, Non-Final Office dated Apr. 27, 2017, and Reply filed Jul. 14, 2017, in U.S. Appl. No. 14/865,005.

* cited by examiner

PROVIDING MULTIPLE ROOTS IN A SEMICONDUCTOR DEVICE

This application claims priority to U.S. Provisional Patent Application No. 62/170,905, filed on Jun. 4, 2015, in the names of Michael T. Klinglesmith, Chang Yong Kang, Robert De Gruijl, Ioannis T. Schoinas, Darren Abramson, and Khee Wooi Lee, entitled PROVIDING MULTIPLE ROOTS IN A SEMICONDUCTOR DEVICE, the disclosure of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (this and related specifications are referred to hereafter as the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (this and related specifications are referred to hereafter as the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

DETAILED DESCRIPTION

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
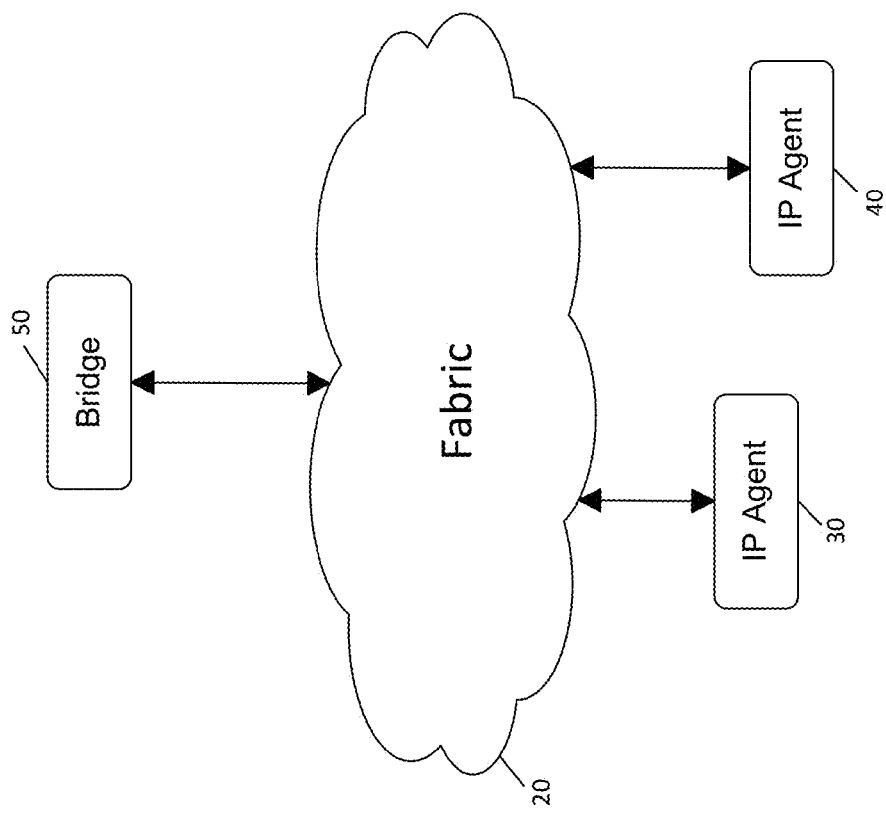
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
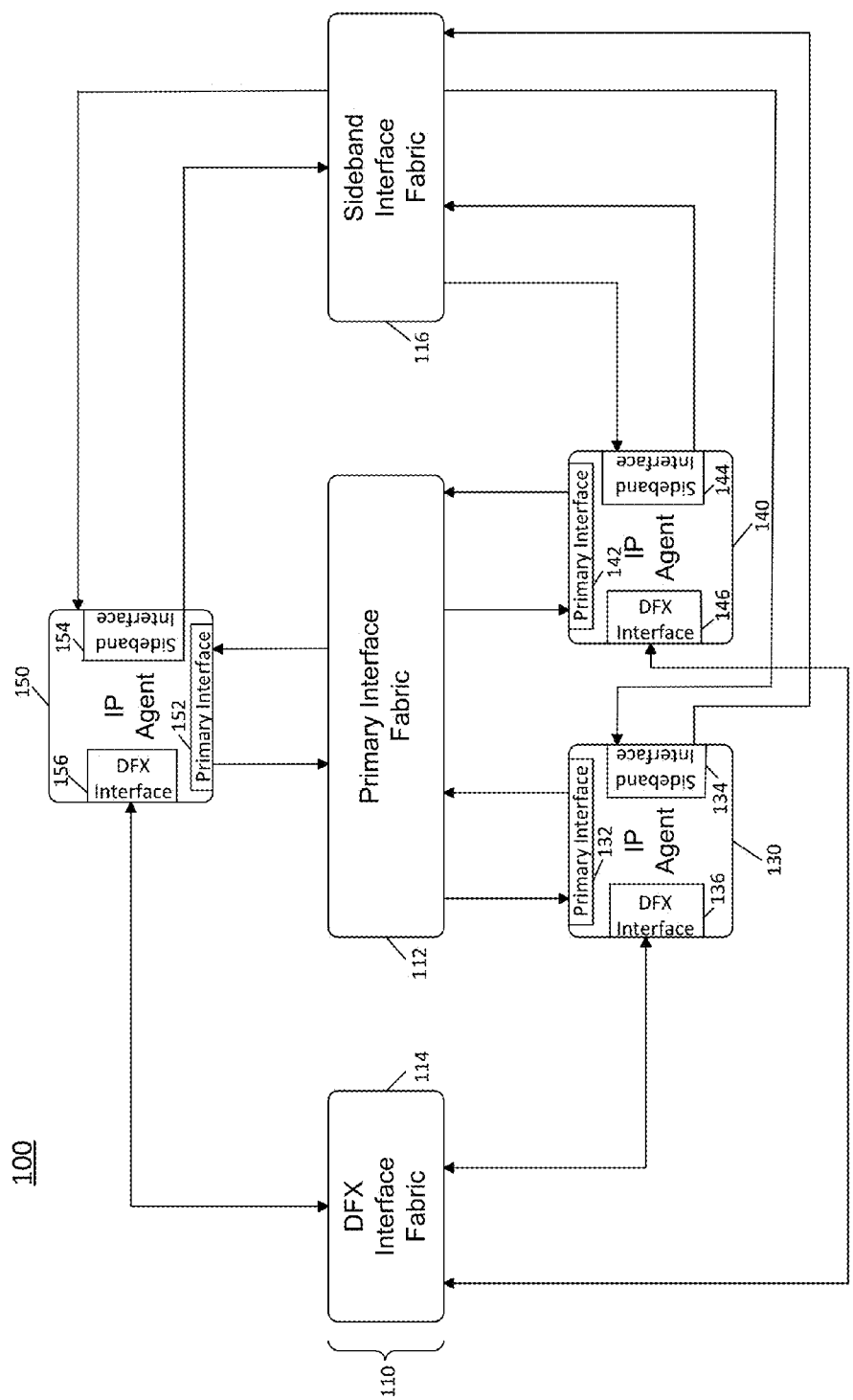
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
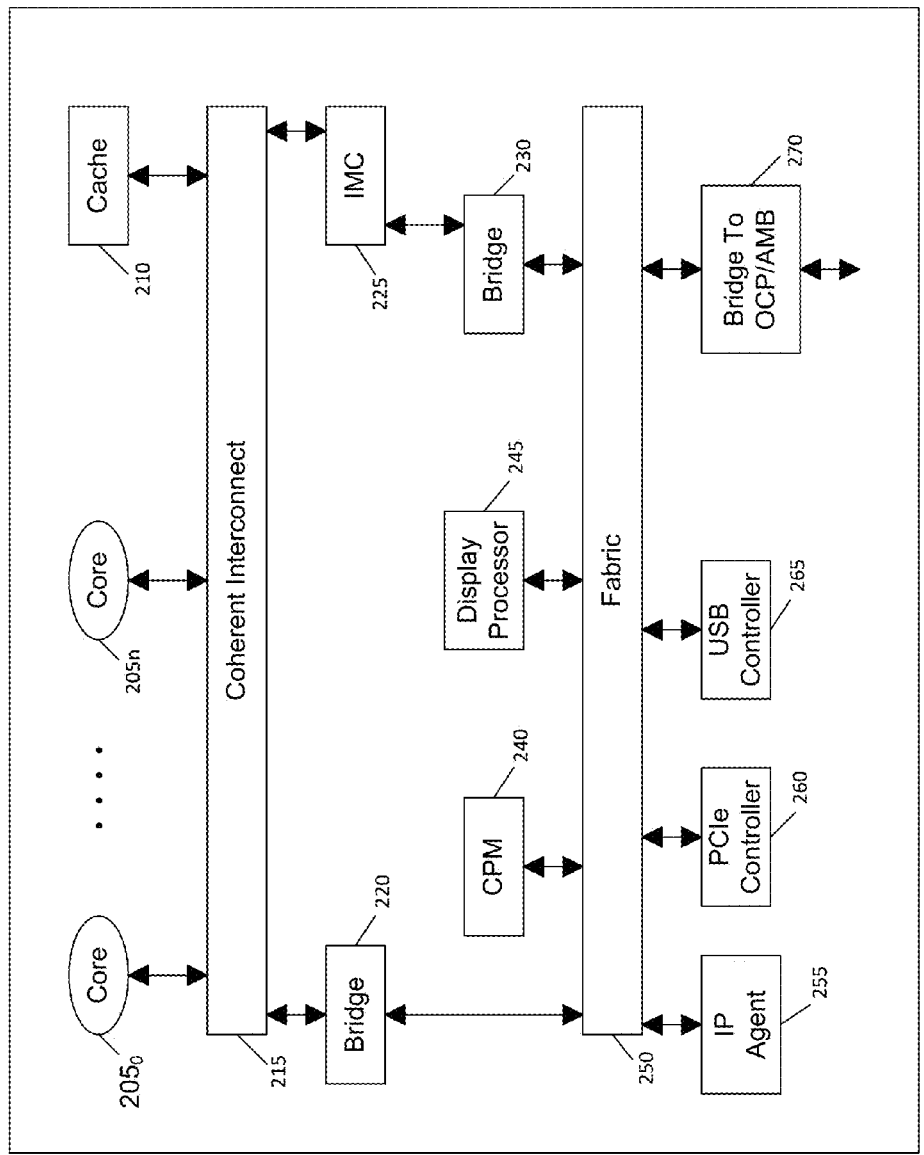
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
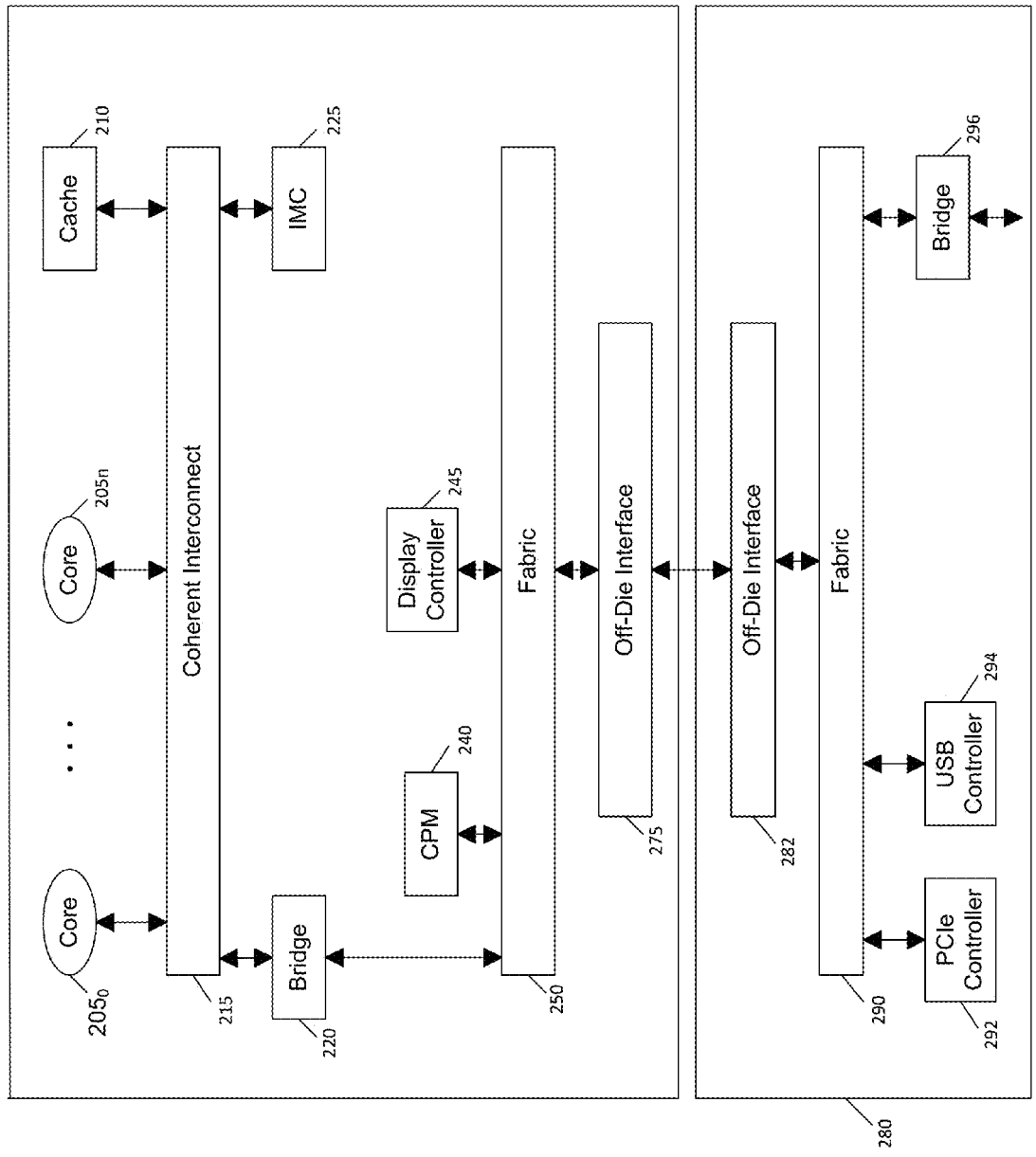
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
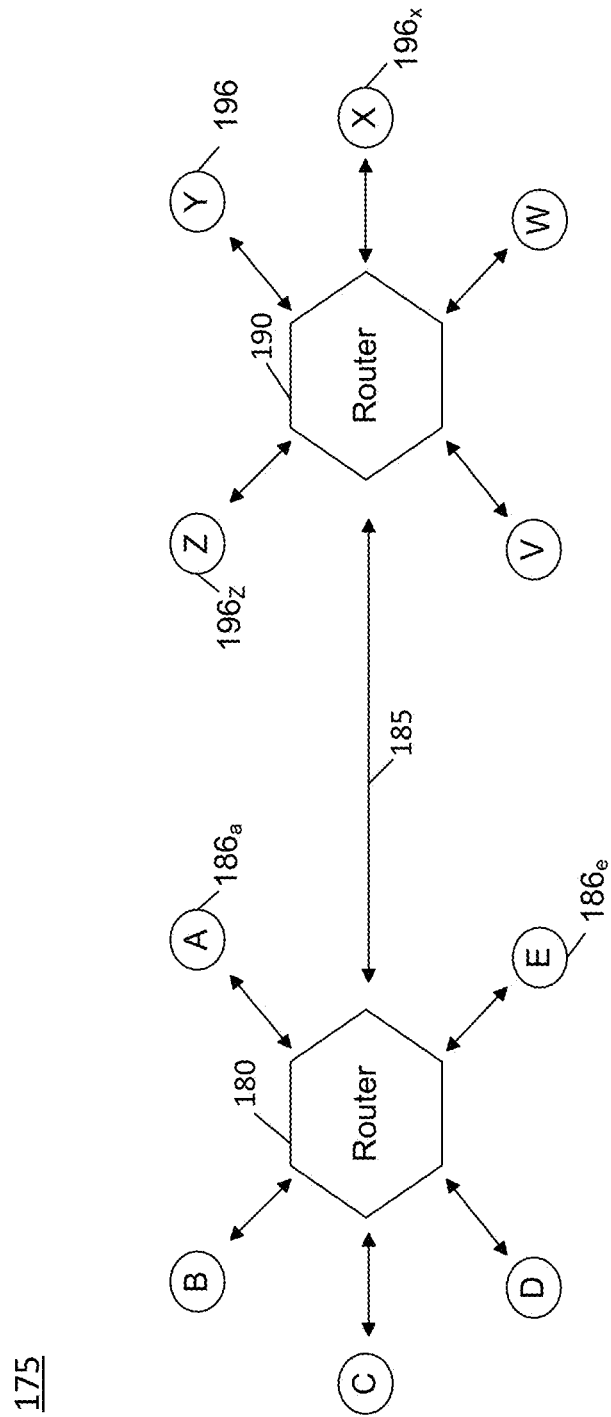
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

In various embodiments, multiple independent domains or roots may be provided in a single semiconductor device such as an SoC or other processor. More specifically, embodiments enable boot time assignment of agents of the device to one of multiple root spaces. In an embodiment, these root spaces may include a secure root space and a user root space. Hardware and software within a root space can be considered an independent computing system. The physical hardware that implements the multiple root spaces has shared components (including in an embodiment a shared fabric, system agent, memory and other components). Every command with a primary interconnect may include a root space attribute, which may be a given field of a command.

As used herein, a root is a collection of resources including one or more cores, a host bridge, system memory, zero or more root complex integrated endpoints, zero or more root complex event collectors, and zero or more root ports. Within a root there may be an entire computer system. Software executing within that root need not be aware that there is more than one root. In a multi-root system, software may run without knowledge of the other roots, and without the need for any changes in the existing software model including microcode, basic input output system (BIOS), virtual machine monitors (VMMs), operating systems (OSs), device drivers, and applications.

A shared fabric implements a complete set of address decode logic for each root space that is independent of the other root spaces. The address decoder used for a transaction is selected based on a root space (RS) indicator (which may be implemented as a plurality of bits to identify a given one of multiple root spaces) in a command (CMD). The system agent may implement some limited address decode functionality for the alternate root spaces and a full decode for the host root space, in an embodiment. Various queue structures (e.g., channels) may be shared between root spaces or may be independent for each root space based on SoC configuration choice. Embodiments thus provide a scalable, architectural solution that can be implemented in a standard configurable fabric.

A multi-root system includes two or more roots that share one or more physical resources. One root may be designated as a privileged root. This privileged root is the first to boot and is responsible for configuring the system. The privileged root completes configuration of the other roots before they are released from reset. Any resource that is not statically assigned to a root (e.g., strap or fuse) is configured by the privileged root. The privileged root is also responsible for coordinating the re-assignment of any resources that can be dynamically re-assigned to different roots. In an embodiment, system configuration is accomplished by programming registers to assign resources to the different roots. In some cases, resource assignment can be static for some resources and dynamic for others. Embodiments may isolate roots by associating transactions with a given root space field (RS field), to enable comparison of the RS value with the RS field.

In order to support the existing software model a root contains certain hardware resources that are owned and controlled by the root. During initialization of the hardware before software is given control of the root, the resources of any root may be accessed or configured by the privileged root. For example, a CPU may include a set of configuration registers (CRs). CRs are owned by the hardware within the root and can only be accessed from microcode executing on the cores of the root. Similarly, each CPU has a set of machine specific registers (MSRs). MSRs are accessible from software executing on the CPU cores of the root.

A single root agent is assigned to and used by a single root at any given time. This assignment can be either static or dynamic. Dynamic assignment of a single root agent may be coordinated with the software executing on the roots involved. Assignment of a single root agent to a root may be implemented by setting the RS value for the agent. The RS field in every primary command is then used in conjunction with address decode mechanisms to ensure the agent is only accessed for transactions associated with the assigned root. In some cases, a single root agent may be multi-root aware. Such agent may include a mechanism such as a register or strap for setting the RS value of the agent, which may be programmed by a privileged root. An address decode logic of the agent may then enforce root-based security policies.

If a single root agent is not multi-root aware, it is the fabric's responsibility to implement hardware logic, e.g., an address decode logic, to enable the agent to be assigned a RS value and to enforce given security policies.

In an embodiment, a multi-root agent can be exposed to two or more roots. This may be accomplished with a dedicated primary interface per root, or with a shared primary interface with dedicated channels. In the case of dedicated interfaces, each interface is assigned an RS value. For dedicated channels, each channel may be associated with an RS value.

When a multi-root agent is used by more than one root concurrently, the agent may be configured with appropriate hardware (e.g., straps or registers) to expose dedicated resources to each root. In an embodiment, software running in a root and interacting with the hardware may be unaware that it is interacting with a multi-root agent.

A host bridge provides the connection between the CPU(s), system memory, and the I/O subsystem, where the I/O subsystem is south of the host bridge, and the CPU(s) are north of the host bridge. A single root host bridge contains resources for one root only. It is statically assigned to a root space. All transactions originating from the north of a single root host bridge are implicitly associated with the root space of the host bridge. Either the host bridge or a fabric below the host bridge is responsible for tagging transactions with the correct RS field, and implementing the multi-root security policies.

If the host bridge includes a bridge to a sideband interconnect, that bridge includes the correct RS value in a security attribute indicator (SAI) field. The system memory behind a single root host bridge can only be accessed with the associated root space in an embodiment. Other roots may use a piece of stolen system memory only through a multi-root non-transparent bridge. The bridge may map the transaction from the originating root space into the destination root space.

A multi-root host bridge receives and processes transactions on behalf of several roots. The division of host bridge resources between root spaces is either statically assigned in hardware or configured at initialization time. The host bridge enforces security policies to ensure the isolation of resources between different roots. A multi-root host bridge that supports assignment of various CPUs on the north to different root spaces tracks the origin of incoming transactions from the north and tags them with the correct RS field. Any cache coherent flows through the host bridge are isolated to the originating root space. System memory of a multi-root host bridge may be divided between multiple root spaces. The host bridge is responsible for maintaining the mapping between the host physical addresses associated with different root spaces and the memory physical address used as the physical address for system memory.

In an embodiment, a multi-root non-transparent bridge is a multi-root agent connected to multiple roots. Such bridge provides one or more communication mechanisms for software in one root to interact with software in another root (e.g., mailbox registers, doorbells, memory translation windows and so forth).

In an embodiment, address decode is performed in the fabric on behalf of an agent that positively decodes against the entire RS field. If the fabric is connected to a single root agent that does not support the RS field, the fabric is responsible for implementing multi-root security policies on behalf of the agent. In an embodiment, such policies includes full decode and comparison of the RS field in the command to the RS value for the agent.

In an embodiment, a sideband fabric uses a single set of destination IDs that are independent of a root in which an endpoint resides. Any transaction that bridges from a primary interconnect to a sideband interconnect may include a RS field from the primary transaction into a given field of the sideband message, such as a SAI field to enable this information to be passed along to an appropriate destination.

Figure 6:
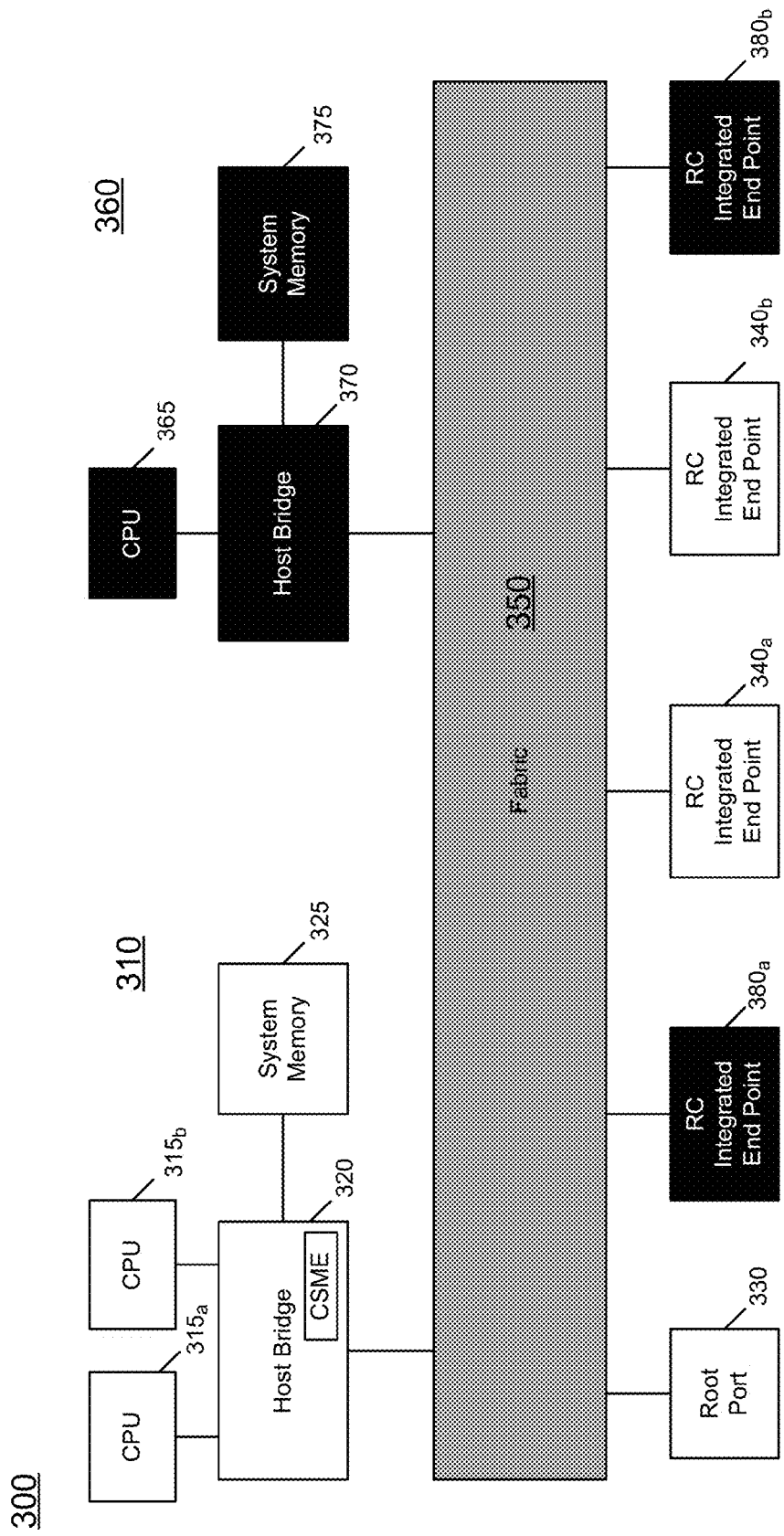
FIG. 6 is a block diagram of a multi-root system in accordance with an embodiment.

Referring now to FIG. 6, shown is a block diagram of a multi-root system in accordance with an embodiment. In the embodiment shown in FIG. 6, multi-root system 300 may be implemented as a SoC or other multicore processor, e.g., implemented in a single processor package. In other cases, system 300 may be implemented as a set of discrete components such as adapted to a motherboard or other circuit board of a given computing system, which can range from a small portable device such as smartphone, tablet computer, or so forth, to a server computer. As illustrated, system 300 includes a first root 310 and a second root 360. In an embodiment, these different roots can be of different privilege levels such that one of the roots (e.g., first root 310) is configured as a privileged root while second root 360 is configured as an unprivileged root. Note the terms "root" and "root space" are used interchangeably herein, and thus roots 310 and 360 also are referred to herein as root spaces.

In the privileged root, various operations to configure a system and to execute privileged code, e.g., of an operating system, hypervisor or so forth may be implemented, while in turn the unprivileged root may execute a variety of unprivileged user applications. Note that the blocks shown in clear form are of first root 310 while the blocks shown in black form are associated with second root 360. In turn, shared resources are illustrated in FIG. 6 as shaded blocks.

As illustrated, first root 310 includes a plurality of CPUs 315a-315b. CPUs 315 couple to a host bridge 320 that in turn is coupled to a system memory 325, which in an embodiment may be a DRAM. As seen host bridge 320 may include a converged security manageability engine (CSME). Host bridge 320 further couples to a fabric 350, which in an embodiment may be an IOSF fabric that is a shared resource between the multiple roots. As such, shared fabric 350 provides interconnection to agents of both root spaces. Still with reference to first root 310, fabric 350 couples to a root port 330 and a plurality of root complex integrated endpoints 340a and 340b.

Referring now to second root 360, a single CPU 365 is present. Of course in other embodiments, multiple CPUs may be associated with this root also. CPU 365 couples to a host bridge 370 that in turn couples to a system memory 375. In turn, host bridge 370 further couples to shared fabric 350, and with regard to components of second root 360, fabric 350 couples to root complex integrated endpoints 380a and 380b. Understand while shown with this particular implementation in the embodiment of FIG. 6, many variations and alternatives are possible.

Figure 7:
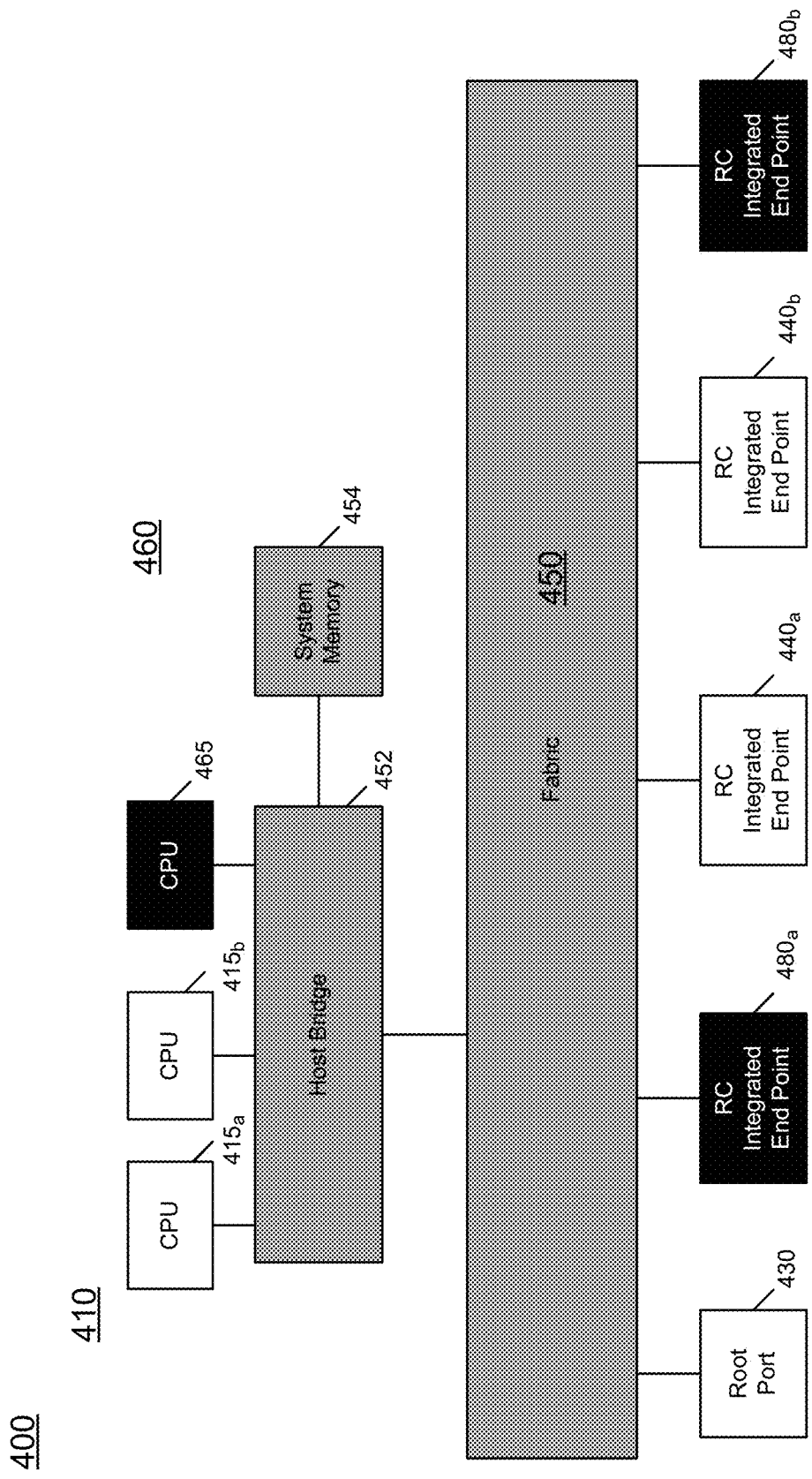
FIG. 7 is a block diagram of a multi-root system in accordance with another embodiment.

Referring now to FIG. 7, shown is a block diagram of a multi-root system in accordance with another embodiment. In the embodiment shown in FIG. 7, multi-root system 400 may be implemented as a SoC or other multicore processor, e.g., implemented in a single processor package, or as a set of discrete components such as adapted to a motherboard or other circuit board of a given computing system. As illustrated, system 400 includes a first root 410 and a second root 460. In an embodiment, these different roots can be of different privilege levels such that one of the roots (e.g., first root 410) is configured as a privileged root while second root 460 is configured as an unprivileged root. As above, the blocks shown in clear form are of first root 410 while the blocks shown in black form are associated with second root 460. In turn, shared resources are illustrated in FIG. 7 as shaded blocks.

As illustrated, first root 410 includes a plurality of CPUs 415a-415b. CPUs 415 couple to a host bridge 452 that in turn is coupled to a system memory 454. Host bridge 452 further couples to a fabric 450, which in an embodiment may be an IOSF fabric. As seen in FIG. 7, host bridge 452, system memory 454 and fabric 450 are shared resources between the multiple roots. As such, shared fabric 450 provides interconnection to agents of both root spaces. Still with reference to first root 410, fabric 450 couples to a root port 430 and a plurality of root complex integrated endpoints 440a and 440b.

Referring now to second root 460, a single CPU 465 is present. Of course in other embodiments multiple CPUs may be associated with this root also. CPU 465 also couples to host bridge 452. With regard to components of second root 460, fabric 450 couples to root complex integrated endpoints 480a and 480b. Understand while shown with this particular implementation in the embodiment of FIG. 7, many variations and alternatives are possible.

Figure 8:
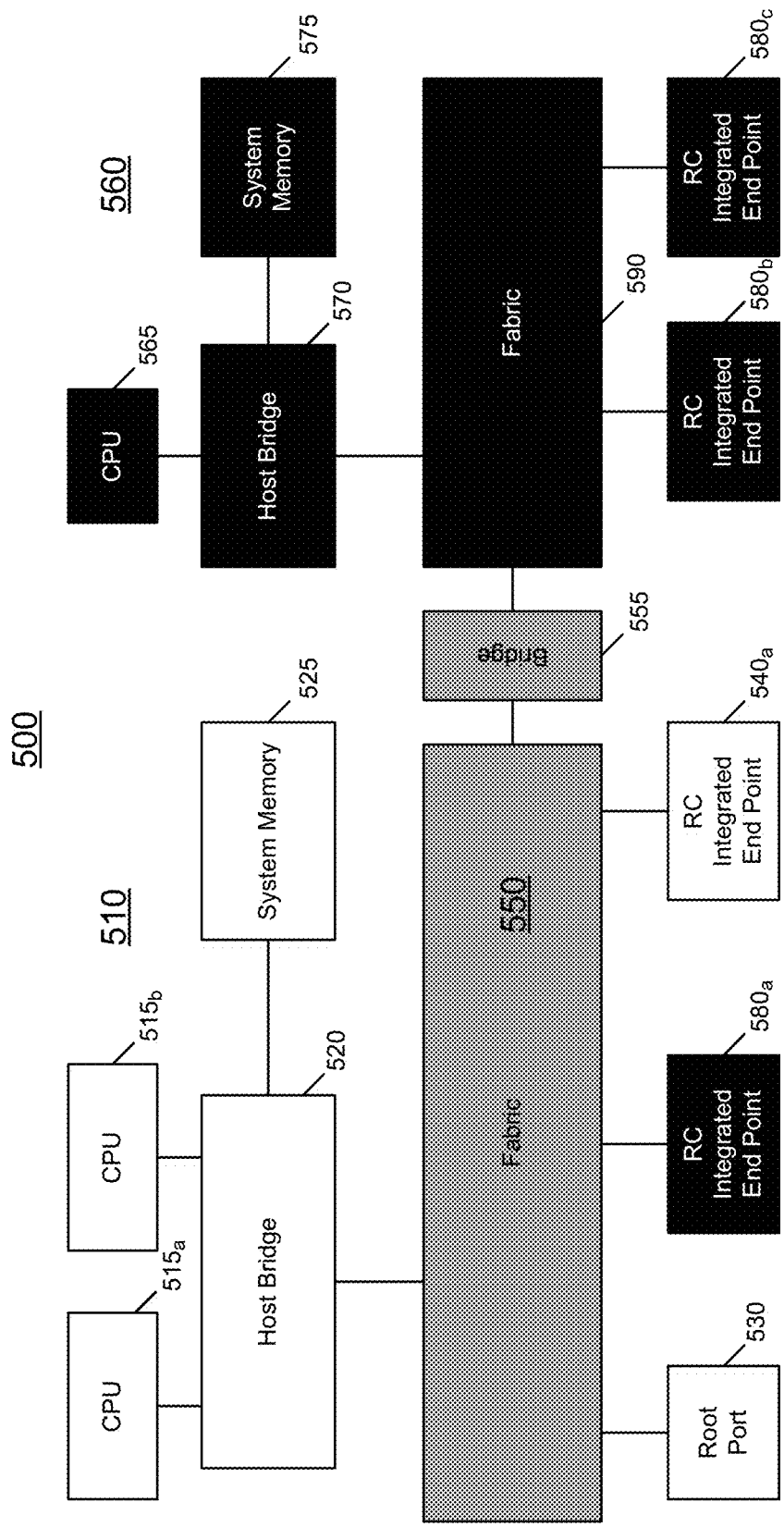
FIG. 8 is a block diagram of a multi-root system in accordance with yet another embodiment.

Referring now to FIG. 8, shown is a block diagram of a multi-root system in accordance with yet another embodiment. In the embodiment shown in FIG. 8, multi-root system 500 may be implemented as a SoC or other multicore processor or as a set of discrete components. As illustrated, system 500 includes a first root 510 and a second root 560. In an embodiment, these different roots can be of different privilege levels such that one of the roots (e.g., first root 510) is configured as a privileged root while second root 560 is configured as an unprivileged root. As above, the blocks shown in clear form are of first root 510 while the blocks shown in black form are associated with second root 560. In turn, shared resources are illustrated in FIG. 8 as shaded blocks.

As illustrated, first root 510 includes a plurality of CPUs 515a-515b. CPUs 515 couple to a host bridge 520 that in turn is coupled to a system memory 525. Host bridge 520 further couples to a fabric 550, which in an embodiment may be an IOSF fabric. As seen in FIG. 8, host bridge 520 and system memory 525 are resources of first root 510. Shared fabric 550 is a shared resource which provides interconnection to agents of both root spaces through a shared bridge 555. Still with reference to first root 510, fabric 550 couples to a root port 530 and a root complex integrated endpoint 540a.

Referring now to second root 560, a single CPU 565 is present. Of course in other embodiments multiple CPUs may be associated with this root also. CPU 565 couples to a host bridge 570 and a system memory 575, which are resources of second root 560. With regard to components of second root 560, fabric 590 couples to root complex integrated endpoints 580b and 580c, and as shown via bridge 555 and fabric 550, also couples to root complex integrated endpoint 580a. Understand while shown with this particular implementation in the embodiment of FIG. 8, many variations and alternatives are possible.

Figure 9:
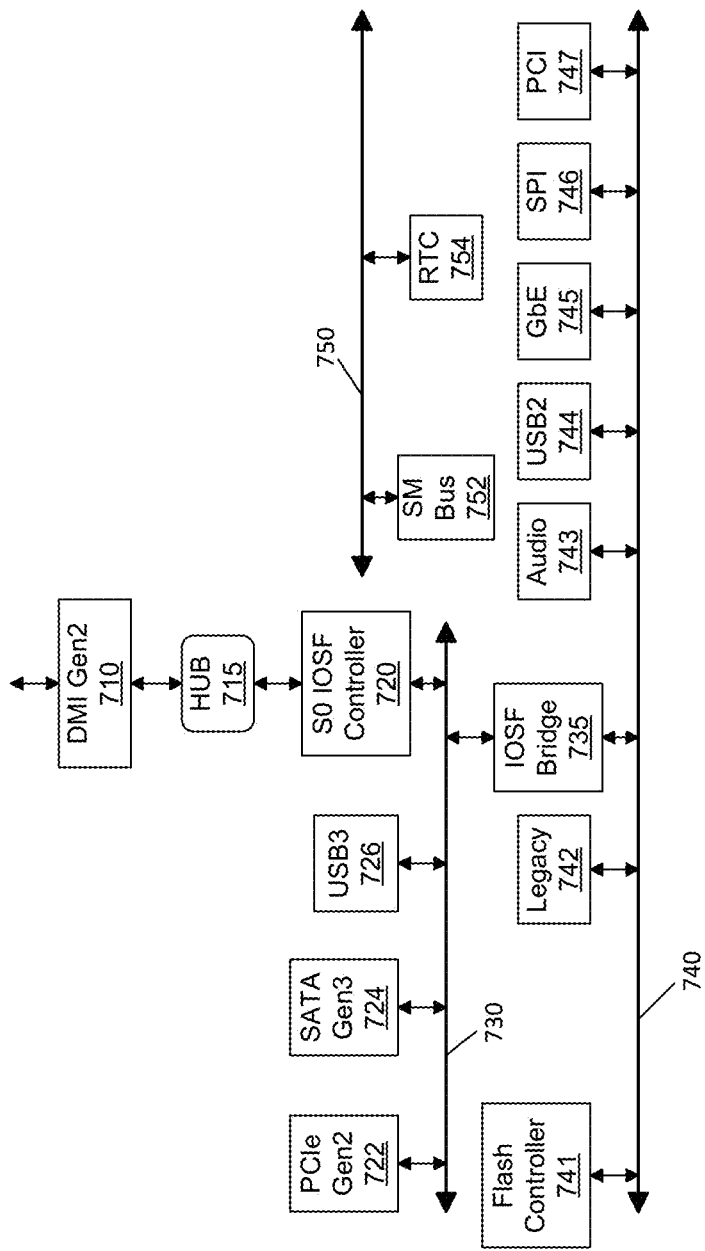
FIG. 9 is a more detailed block diagram of a portion of a SoC in accordance with an embodiment of the present invention.

Although the SoCs above are at a high level, understand that additional functionality may be present. Referring now to FIG. 9, shown is a more detailed block diagram of a portion of a SoC in accordance with an embodiment of the present invention. As shown in FIG. 9, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 9, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 9, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 9, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 9, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 9, understand the scope of the present invention is not limited in this regard.

Figure 10:
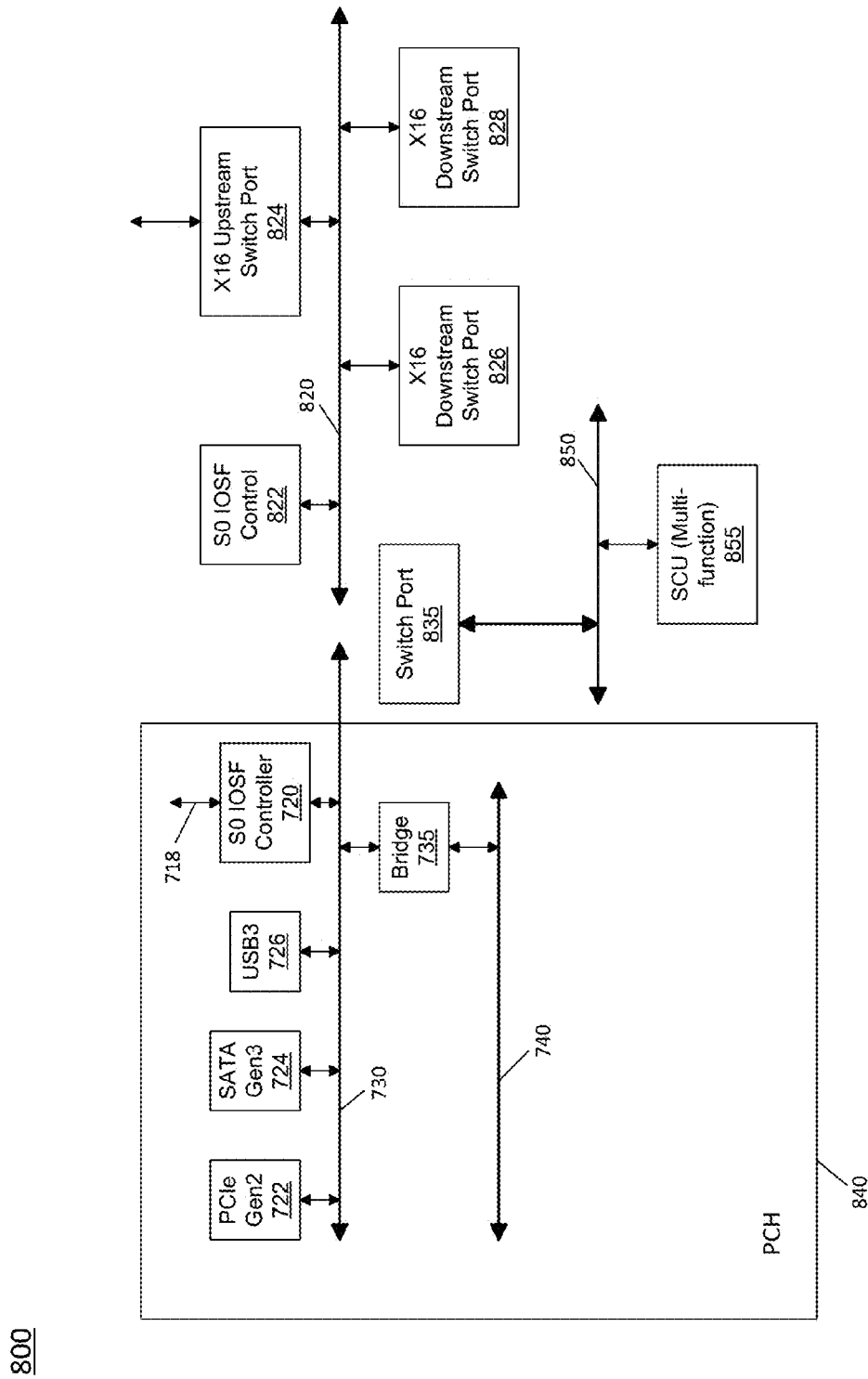
FIG. 10 is a block diagram of another SoC in accordance with an embodiment the present invention.

Still other implementations are possible. Referring now to FIG. 10, shown is a block diagram of another SoC in accordance with an embodiment the present invention. As shown in FIG. 10, SoC 800 may be configured for use, e.g., in server systems. As seen in FIG. 10, SoC may include a platform controller hub (PCH) 840, which may generally include components such as seen in the embodiment of FIG. 9. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 10).

As further seen in FIG. 10, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

To enable a multi-root system, the system is configured for multi-root operation. To this end, multiple root spaces may be defined. Such definition may be implemented on configuration of an SoC or other processor, or the definition can be performed dynamically. For example, one or more agents can be dynamically associated with different root spaces at different times.

Figure 11:
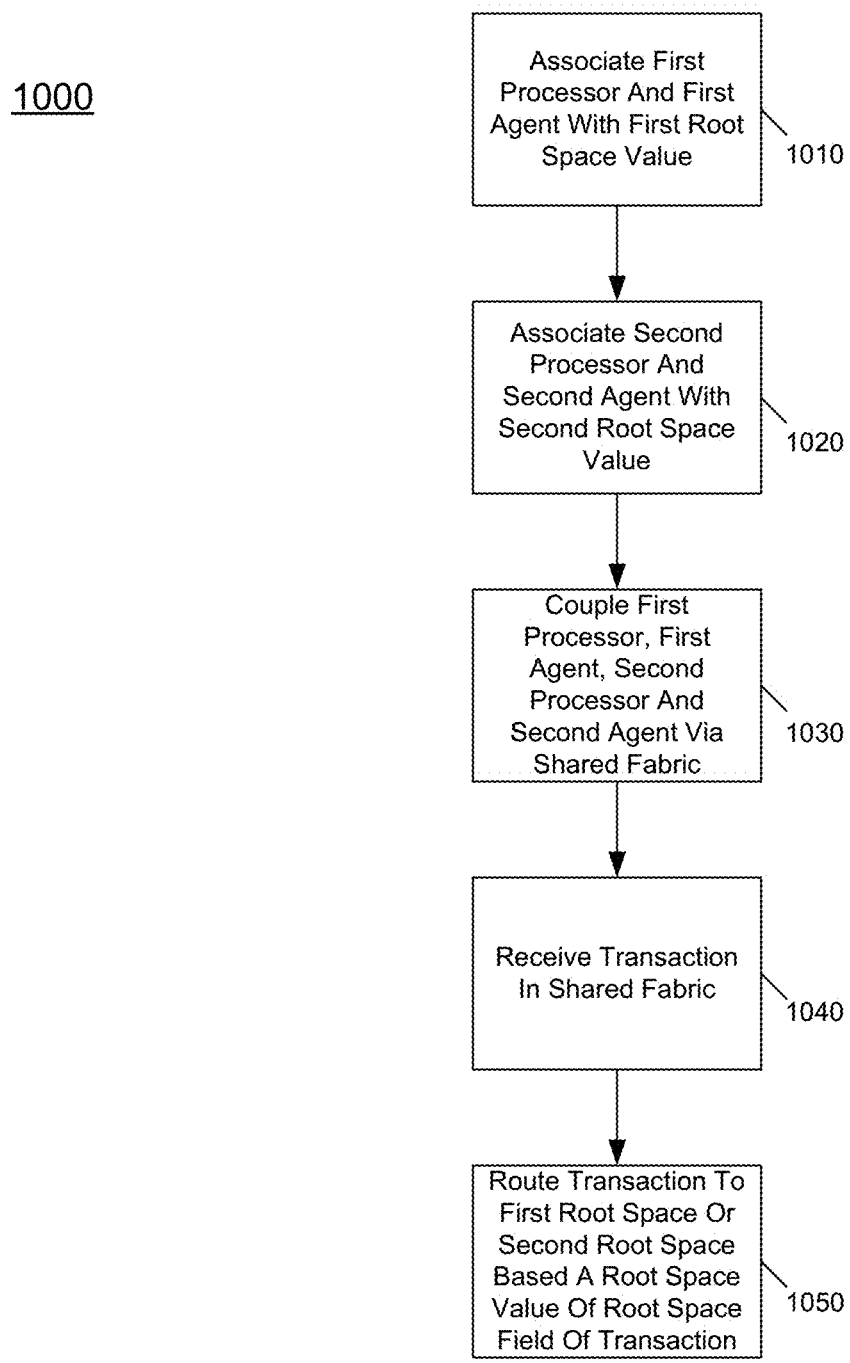
FIG. 11 is a flow diagram of a method in accordance with an embodiment of the present invention.

Referring now to FIG. 11, shown is a flow diagram of a method in accordance with an embodiment of the present invention. As shown in FIG. 11, method 1000 may be performed within an SoC to enable multi-root space configuration and operation. As seen, method 1000 beings by associating at least a first processor and at least a first agent (which may be an endpoint or other agent of an SoC) with a first root space value (block 1010). To this end, each such component can be associated with this first root space value by storage of the given value in a storage included in or associated with the component, such as a configuration storage. By this association, a first root space is defined to include these components. Similar operations may occur at block 1020 to associate at least a second processor and at least a second agent with a second root space value, to define a second root space.

Still referring to FIG. 11, these components all may be coupled together, e.g., via a shared fabric, which may be implemented in an embodiment as an IOSF fabric (block 1030). At this point, the SoC is configured for normal operation.

Thus as shown in FIG. 11, during operation a transaction may be received in this shared fabric (block 1040). Based at least in part on a root space value of a root space field of the transaction, the shared fabric may route the transaction to a given one of the multiple root spaces (and more specifically to a particular destination agent within the root space) (block 1050). Understand while shown at this high level in the embodiment of FIG. 11, many variations and alternatives are possible.

Figure 12:
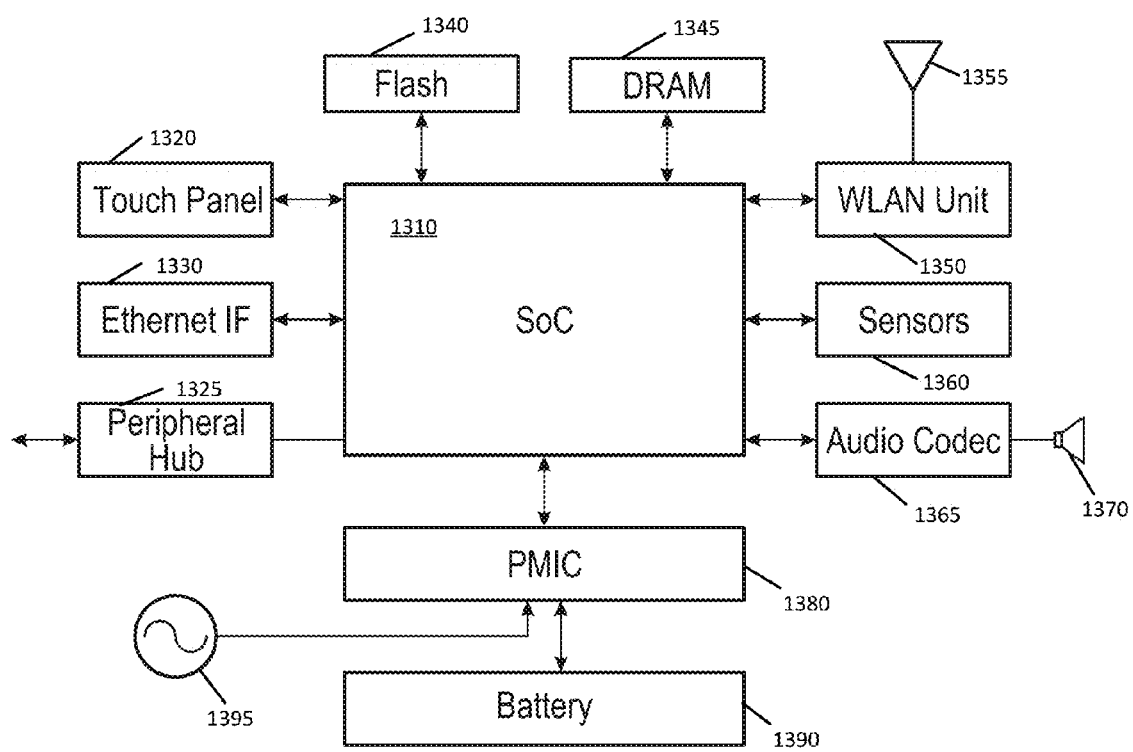
FIG. 12 is a block diagram of example system with which embodiments may be used.

Referring now to FIG. 12, shown is a block diagram of example system with which embodiments may be used. In the illustration of FIG. 12, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may be configured to include multiple root spaces as described herein, and in which one or more agents may be dynamically associated with one or more of the root spaces. Such multi-root-aware device in turn may be configured to implement partial reset operations as described herein, in cooperation with a power controller and/or fabric.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a power management integrated circuit (PMIC) 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 12, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 12, many variations and alternatives are possible.

Figure 13:
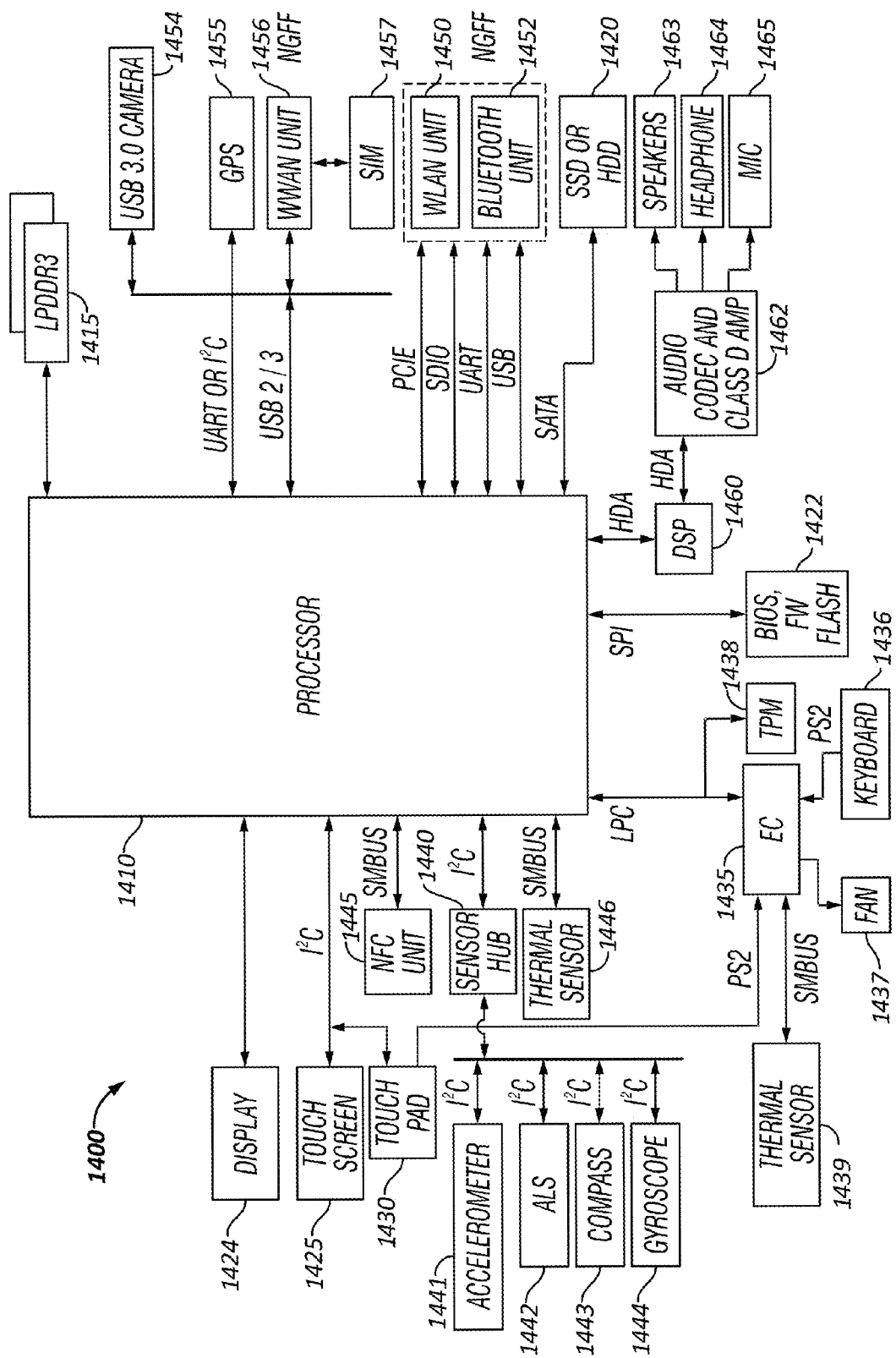
FIG. 13 is a block diagram of a representative computer system.

Referring now to FIG. 13, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC that provides for multiple root spaces and their configuration and control, as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 13, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 13 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 13, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I2C interconnect. In the embodiment shown in FIG. 13, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 13, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 13, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 13, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 13, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 13, understand the scope of the present invention is not limited in this regard.

Note that the above system may be implemented as a single chip SoC, or it may be implemented as a set of chips.

The following examples pertain to further embodiments.

In one example, a system comprises: at least one first processor and a first agent, the at least one first processor and the first agent associated with a first root space value to define a first root space; at least one second processor and a second agent, the at least one second processor and the second agent associated with a second root space value to define a second root space; and a shared fabric to couple to the at least one first processor, the first agent, the at least one second processor and the second agent, the shared fabric to route a transaction to the first root space or the second root space based at least in part on a root space value in a root space field of the transaction.

In an example, the first root space comprises a privileged root to boot before the second root space and to configure the system.

In an example, the first agent is to be dynamically assigned to the first root space value and thereafter to be dynamically assigned to the second root space value to be included in the second root space.

In an example, the shared fabric is to isolate the first root space from the second root space.

In an example, the system further comprises a host bridge comprising a first logical host bridge associated with the first root space and a second logical host bridge associated with the second root space.

In an example, the system further comprises a system memory to be shared by the first root space and the second root space, the system memory having a first partition associated with the first root space and a second partition associated with the second root space.

In an example, a system bridge is to couple the shared fabric to a second fabric, the second fabric included in the first root space.

In an example, the first agent comprises a root logic to prevent access to an incoming transaction having a root space value in a root space field of the incoming transaction different than the first root space value.

In an example, the first agent comprises a storage to be programmed with the first root space value.

In an example, the system comprises a SoC.

In another example, a method comprises: associating at least one first processor of an SoC and at least one first agent of the SoC with a first root space value, to define a first root space of the SoC; associating at least one second processor of the SoC and at least one second agent of the SoC with a second root space value, to define a second root space of the SoC; receiving a transaction in a shared fabric coupled to the first root space and the second root space; and routing the transaction to a selected one of the first root space and the second root space based at least in part on a root space value of a root space field of the transaction.

In an example, the method further comprises booting the first root space first to configure a system including the SoC, where the first root space comprises a privileged root.

In an example, the method further comprises re-assigning the at least one first agent from the first root space to the second root space by association of the at least one first agent with the second root space value.

In an example, the method further comprises inserting a root space value into a root space field of a first transaction directed to a destination agent into a security attribute indicator field of a second transaction, where the first transaction is to be received in the shared fabric via a primary interface of the shared fabric and the second transaction is to be communicated via a sideband interface of the shared fabric to the destination agent.

In an example, the method further comprises dynamically associating the at least one first agent with the first root space value to cause the at least one agent to be included in the first root space, and thereafter dynamically associating the at least one first agent with the second root space value to cause the at least one first agent to be included in the second root space.

In an example, the method further comprises isolating, by the shared fabric, the first root space from the second root space.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In an example, an apparatus comprises a semiconductor die including but not limited to various circuitry. Such circuitry may include, in an example: a plurality of agents, at least a first subset of the plurality of agents associated with a first root space value to define a first root space and at least a second subset of the plurality of agents associated with a second root space value to define a second root space; and a fabric coupled to the plurality of agents via a fabric primary interface, the fabric primary interface including at least one master interface to initiate transactions and at least one target interface to receive transactions, where the fabric is to route a transaction to the first root space or the second root space based at least in part on a root space value in a root space field of the transaction.

In an example, the fabric is to enable independent reset of the first root space and the second root space.

In an example, the apparatus comprises a SoC, which may further comprise: at least one first core associated with the first root space and at least one second core associated with the second root space; a first coherent interconnect coupled to the at least one first core; a second coherent interconnect coupled to the at least one second core; and a router coupled to at least some of the plurality of agents via a sideband interconnect.

In an example, the apparatus further comprises at least one component coupled to the fabric via a bridge, where the at least one component is of an open core protocol (OCP) or an ARM advanced microcontroller bus architecture (AMBA) protocol.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on chip (SoC) comprising:
a semiconductor die comprising:
at least one first processor and a first agent, the at least one first processor and the first agent associated with a first root space value to define a first root space;
at least one second processor and a second agent, the at least one second processor and the second agent associated with a second root space value to define a second root space;
a shared fabric to couple to the at least one first processor, the first agent, the at least one second processor and the second agent, the shared fabric to receive a transaction from a source agent and route the transaction to the first root space or the second root space based at least in part on a root space value in a root space field included in the transaction; and
a host bridge comprising a first logical host bridge associated with the first root space and a second logical host bridge associated with the second root space, the host bridge further comprising a bridge to send a second transaction via a sideband interconnect, the bridge to insert into the second transaction a security field comprising the first root space value.

2. The SoC of claim 1, wherein the first root space comprises a privileged root to boot before the second root space and to configure the system.

3. The SoC of claim 1, wherein the first agent comprises a storage to store at least one of the first root space value and the second root space value.

4. The SoC of claim 1, wherein the shared fabric is to isolate the first root space from the second root space.

5. The SoC of claim 1, further comprising a system memory to be shared by the first root space and the second root space, the system memory having a first partition associated with the first root space and a second partition associated with the second root space.

6. The SoC of claim 1, further comprising a system bridge to couple the shared fabric to a second fabric, the second fabric included in the first root space.

7. The SoC of claim 1, wherein the first agent comprises a storage to be dynamically programmed with the first root space value by a privileged root.

8. A non-transitory computer readable storage medium including information that, when manufactured into a system on a chip (SoC), is to configure the SoC to:

associate at least one first processor of the SoC and at least one first agent of the SoC with a first root space value, to define a first root space of the SoC;

associate at least one second processor of the SoC and at least one second agent of the SoC with a second root space value, to define a second root space of the SoC;

receive a transaction from an initiator in a shared fabric coupled to the first root space and the second root space;

route the transaction to a selected one of the first root space and the second root space based at least in part on a root space value of a root space field included in the transaction; and insert a root space value into a root space field included in a first transaction directed to a destination agent into a security attribute indicator field of a second transaction, wherein the first transaction is to be received in the shared fabric via a primary interface of the shared fabric and the second transaction is to be communicated via a sideband interface of the shared fabric to the destination agent.

9. The non-transitory computer readable medium of claim 8, wherein the information, when manufactured into the SoC, is to configure the SoC to enable the first root space to boot first to configure a system including the SoC, wherein the first root space comprises a privileged root.

10. The non-transitory computer readable medium of claim 8, wherein the information, when manufactured into the SoC, is to configure the SoC to store at least one of the first root space value and the second root space value in hardware of the at least one first agent.

11. The non-transitory computer readable medium of claim 8, wherein the information, when manufactured into the SoC, is to configure the SoC to enable the at least one first agent to dynamically be associated with the first root space value to cause the at least one first agent to be included in the first root space, and thereafter to be dynamically associated with the second root space value to cause the at least one first agent to be included in the second root space.

12. The non-transitory computer readable medium of claim 8, wherein the information, when manufactured into the SoC, is to configure the SoC to enable the shared fabric to isolate the first root space from the second root space.

13. An apparatus comprising:
a semiconductor die including but not limited to:
a plurality of agents, at least a first subset of the plurality of agents having a first storage to store a first root space value to define a first root space and at least a second subset of the plurality of agents having a second storage to store a second root space value to define a second root space;

a fabric coupled to the plurality of agents via a fabric primary interface, the fabric primary interface including at least one master interface to initiate transactions and at least one target interface to receive transactions, wherein the fabric is to route a transaction to the first root space or the second root space based at least in part on a root space value in a root space field included in the transaction; and a host bridge comprising a first logical host bridge associated with the first root space and a second logical host bridge associated with the second root space, the host bridge further comprising a bridge to send a second transaction via a sideband interconnect, the bridge to insert into the second transaction a security field comprising the first root space value.

14. The apparatus of claim 13, wherein the fabric is to enable independent reset of the first root space and the second root space.

15. The apparatus of claim 13, wherein the apparatus comprises a system-on-chip (SoC) further comprising:
at least one first core associated with the first root space and at least one second core associated with the second root space;
a first coherent interconnect coupled to the at least one first core;
a second coherent interconnect coupled to the at least one second core; and
a router coupled to at least some of the plurality of agents via the sideband interconnect.

16. The apparatus of claim 13, further comprising at least one component coupled to the fabric via a bridge, wherein the at least one component is of an open core protocol (OCP) or an ARM advanced microcontroller bus architecture (AMBA) protocol.

17. The SoC of claim 7, wherein the first agent further comprises a root logic comprising a first address decode logic to prevent access to an incoming transaction having a root space value in a root space field included in the incoming transaction different than the first root space value stored in the storage.

* * * * *